(12) United States Patent
Klein et al.

(10) Patent No.: US 10,917,256 B2
(45) Date of Patent: Feb. 9, 2021

(54) GUEST USER ACCESS IN THE IP MULTIMEDIA SUBSYSTEM IMS

(71) Applicant: TELEFONAKTIEBOLAGET LM ERICSSON (PUBL), Stockholm (SE)

(72) Inventors: Mikael Klein, Huddinge (SE); Andreas Anulf, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 218 days.

(21) Appl. No.: 16/317,067

(22) PCT Filed: Aug. 3, 2016

(86) PCT No.: PCT/EP2016/068524
§ 371 (c)(1),
(2) Date: Jan. 11, 2019

(87) PCT Pub. No.: WO2018/024325
PCT Pub. Date: Feb. 8, 2018

(65) Prior Publication Data
US 2019/0296927 A1   Sep. 26, 2019

(51) Int. Cl.
*H04L 12/18* (2006.01)
*H04L 29/06* (2006.01)

(52) U.S. Cl.
CPC ........ *H04L 12/1818* (2013.01); *H04L 65/104* (2013.01); *H04L 65/1016* (2013.01); *H04L 65/608* (2013.01)

(58) Field of Classification Search
CPC ....... H04L 12/1813–1831; H04L 65/10–1096; H04L 65/60–80
See application file for complete search history.

(56) References Cited

U.S. PATENT DOCUMENTS 9,401,908 B1 * 7/2016 Gangadharan ...... H04L 65/1069
9,628,488 B1 * 4/2017 Desai .................. H04L 63/0428
(Continued)

OTHER PUBLICATIONS

3GPP TS 24.147 V15.0.0, 3rd Generation Partnership Project; Technical Specification Group Core Network and Terminals; Conferencing using the IP Multimedia (IM) Core Network (CN) subsystem; Stage 3 (Release 15), Jun. 2018, pp. 1-210.
(Continued)

*Primary Examiner* — David R Lazaro
*Assistant Examiner* — Julian Chang
(74) *Attorney, Agent, or Firm* — Patent Portfolio Builders PLLC (57) ABSTRACT

A method of facilitating participation of a WebRTC enabled terminal in an ad hoc conference or chat session hosted in an IP Multimedia Subsystem (IMS) network, where there is an ongoing session between first and second terminals using the IMS network. The method comprises sending a link from the first terminal to a third terminal that is not provisioned or not registered with the IMS network, where the third terminal is said WebRTC enabled terminal and the link provides access to a conference/chat-correlator identifying said ongoing session, and sending a session invite from the third terminal to the first terminal, via a WebRTC gateway, WGw, the session invite including the conference/chat-correlator. The method further comprises, at the first terminal setting up a second session between the first terminal and the third terminal in response to the received session invite, and at the first terminal using the conference/chat-correlator in the received session invite to associate the ongoing and second sessions, and joining both sessions into an ad hoc conference or chat session hosted in the IMS network.

14 Claims, 5 Drawing Sheets

(56) References Cited

U.S. PATENT DOCUMENTS

| | | | | |
|---|---|---|---|---|
| 9,667,790 | B1* | 5/2017 | Desai | H04M 3/42068 |
| 10,637,929 | B1* | 4/2020 | Rai | H04L 65/1046 |
| 2014/0293832 | A1 | 10/2014 | Parikh et al. | |
| 2014/0379931 | A1* | 12/2014 | Gaviria | H04L 67/02 709/227 |
| 2015/0002614 | A1* | 1/2015 | Zino | H04N 21/4788 348/14.08 |
| 2015/0029296 | A1* | 1/2015 | Ni | H04N 7/148 348/14.01 |
| 2015/0127709 | A1* | 5/2015 | Pai | H04L 65/1006 709/202 |
| 2015/0142879 | A1* | 5/2015 | Rameil-Green | H04L 41/28 709/203 |
| 2015/0188843 | A1* | 7/2015 | Chauhan | H04W 48/08 709/225 |
| 2015/0207847 | A1* | 7/2015 | Kim | H04L 67/04 709/204 |
| 2015/0236905 | A1* | 8/2015 | Bellan | H04L 67/141 709/222 |
| 2015/0280963 | A1* | 10/2015 | Bollapalli | H04W 48/00 709/227 |
| 2015/0312179 | A1* | 10/2015 | Ben-Ezra | H04L 51/043 709/203 |
| 2015/0373056 | A1* | 12/2015 | Bouthemy | H04L 65/1006 709/203 |
| 2016/0127199 | A1* | 5/2016 | Ding | H04L 67/02 709/226 |
| 2016/0127510 | A1* | 5/2016 | Ding | H04L 65/4069 709/203 |
| 2016/0142467 | A1* | 5/2016 | Ban | H04L 65/105 709/219 |
| 2016/0149836 | A1* | 5/2016 | Narayanan | H04L 65/1033 709/206 |
| 2016/0149986 | A1* | 5/2016 | Ding | H04L 67/02 709/217 |
| 2016/0150027 | A1* | 5/2016 | Ding | H04L 67/143 709/227 |
| 2016/0173464 | A1* | 6/2016 | Wang | H04L 67/02 713/171 |
| 2016/0191523 | A1* | 6/2016 | Jian | H04L 65/1016 726/4 |
| 2016/0219093 | A1* | 7/2016 | Gangadharan | H04L 65/1069 |
| 2016/0277920 | A1* | 9/2016 | Rajasekar | H04L 65/1016 |
| 2016/0315938 | A1* | 10/2016 | Kunz | H04W 12/06 |
| 2016/0316414 | A1* | 10/2016 | Yeoum | H04L 65/1096 |
| 2016/0337410 | A1* | 11/2016 | Hancock | H04L 65/608 |
| 2017/0104704 | A1* | 4/2017 | Choi | H04L 51/046 |
| 2017/0141934 | A1* | 5/2017 | Ding | H04L 12/66 |
| 2017/0244765 | A1* | 8/2017 | Shan | H04L 1/1812 |
| 2018/0007102 | A1* | 1/2018 | Klein | H04L 65/1026 |
| 2018/0007204 | A1* | 1/2018 | Klein | H04L 67/22 |
| 2018/0007205 | A1* | 1/2018 | Klein | H04L 67/42 |
| 2018/0007206 | A1* | 1/2018 | Klein | H04L 12/1827 |
| 2019/0141094 | A1* | 5/2019 | Castellanos Zamora | H04L 65/1016 |
| 2019/0296927 | A1* | 9/2019 | Klein | H04L 12/1818 |

OTHER PUBLICATIONS

Basar Daldal et al., "Using Web Services for WebRTC Signaling Interoperability", IEEE/IFIP Network Operations and Management Symposium (NOMS 2016), Apr. 25, 2016, pp. 780-783.

Ericsson, "Ad-hoc Conferencing in MTAS", Ericsson Internal Functional Spec., Apr. 3, 2018, pp. 1-230.

Ericsson, "WCG Technical Product Description", Virtual Web Communication Gateway 16A, TECHN Product DESCR, 221 02-FGC 101 3074 Uen Rev E, Jun. 27, 2017, pp. 1-81.

ETSI TS 123 228 V13.6.0, "Digital cellular telecommunications system (Phase 2+) (GSM); Universal Mobile Telecommunications System (UMTS); LTE; IP Multimedia Subsystem (IMS); Stage 2 (3GPP TS 23.228 version 13.6.0 Release 13)", Technical Specification, European Telecommunications Standards Institute, Jul. 1, 2016, pp. 1-316.

International Search Report and Written Opinion, dated Apr. 5, 2017, from corresponding/related International Application No. PCT/EP2016/068524.

3GPP, 5G; 3GPP TS 24.605 V15.0.0 (Jun. 2018); "3rd Generation Partnership Project; Technical Specification Group Core Network and Terminals; Conference (CONF) using IP Multimedia (IM) Core Network (CN subsystem; Protocol Specification"; Release 15; Jun. 2018, 25 pages.

* cited by examiner

GUEST USER ACCESS IN THE IP MULTIMEDIA SUBSYSTEM IMS

TECHNICAL FIELD

The present invention relates to an IP Multimedia Subsystem conferencing method and more particularly a method suitable for enabling a guest WebRTC enabled device to participate in a conference/instant messaging (chat) session with one or more parties registered in the IMS.

BACKGROUND

IP Multimedia (IPMM) services provide a dynamic combination of voice, video, messaging, data, etc. within the same session. By growing the numbers of basic applications and the media which it is possible to combine, the number of services offered to the end users will grow, and the inter-personal communication experience will be enriched. This is leading to a new generation of personalised, rich multimedia communication services, including so-called "combinational IP Multimedia" services which are considered in more detail below.

The IP Multimedia Subsystem (IMS) is the technology defined by the Third Generation Partnership Project (3GPP) to provide IP Multimedia services over 2G/3G and later mobile communication networks. IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and web servers). The Session Description Protocol (SDP), carried by SIP signalling, is used to describe and negotiate the media components of the session. Others protocols are used for media transmission and control, such as Real-time Transport Protocol and Real-time Transport Control Protocol (RTP/RTCP), Message Session Relay Protocol (MSRP), Hyper Text Transfer Protocol (HTTP). IMS requires an access network which would typically be a 2G/3G network, but which might be some other access network such as fixed broadband or WiFi. WebRTC (Web Real-Time Communication) is defined by the World Wide Web Consortium (W3C) and supports in-browser applications for voice, video, data channel and screen sharing without the need for any internal or external plugins in the web browser. A use case that the new WebRTC technology allows for is to distribute an HTTP link (for instance in an email) and allow a user to establish communication with a peer by clicking on the link.

Whilst WebRTC may enable browser-to-browser sessions, a WebRTC Gateway (WGw) may be used as an interface between WebRTC enabled browsers and established VoIP networks, e.g. VoIP networks relying on SIP. Whilst such a VoIP network may be an enterprise network, a WGw may also provide an interface to telecommunication networks such as Public Land Mobile Networks (PLMN). The WGw, incorporated with WebRTC and based on the well-known web technologies like HTTP, can provide communication APIs that translate signaling protocols between the Internet and telecommunication worlds, e.g. IMS domain, in an internet-friendly way, making it easy to add communication to web-based and native-device applications. Telecom network operators can exploit valuable communication assets in new ways by converging internet services with telecom networks through the WGw, enabling communication services to be accessed directly from within web browsers.

Relevant standard specifications are 3GPP TS 24.147 and 3GPP TS 24.605.

A common service offered by telecommunication network operators is the conference facility. One example of a conferencing facility is the so-called ad-hoc or dial-out conference facility where further parties may be added to an existing conference or one-to-one session. In the ad hoc service, a Conference Creator (CC) creates the conference, and then invites participants (CP) to the conference by sending a SIP request to the Telephony Application Server (TAS) in the IMS network. The TAS will then send out an invitation, using SIP, to each participant. Each user receiving such a request can decide to accept or ignore the invitation. There is also a known technique to move an existing active two-party session to the conference. Unfortunately, the procedure described above, where a user can initiate a call by clicking on a link in a browser window, does not currently work for IMS ad hoc conferences as IMS currently requires that all users involved in the communication are known to the IMS network (i.e. provisioned) and have registered and authenticated in the IMS network. This is because the TAS sends out invitations to IMS users and if the user is not known to the IMS network then the TAS does not have a valid destination to send the invite to.

SUMMARY

It is an object of the present invention to allow an external WebRTC user (a guest user) to take part in an ad-hoc conference (i.e. video or audio conference) or instant messaging (chat) session in the IMS without being provisioned or registered in the IMS.

According to the present invention there is provided a method of facilitating participation of a WebRTC enabled terminal in an ad hoc conference or chat session hosted in an IP Multimedia Subsystem (IMS) network, where there is an ongoing session between first and second terminals using the IMS network. The method comprises sending a link from the first terminal to a third terminal that is not provisioned or not registered with the IMS network, where the third terminal is said WebRTC enabled terminal and the link provides access to a conference/chat-correlator identifying said ongoing session, and sending a session invite from the third terminal to the first terminal, via a WebRTC gateway, WGw, the session invite including the conference/chat-correlator. The method further comprises, at the first terminal setting up a second session between the first terminal and the third terminal in response to the received session invite, and at the first terminal using the conference/chat-correlator in the received session invite to associate the ongoing and second sessions, and joining both sessions into an ad hoc conference or chat session hosted in the IMS network.

The first terminal may be an IMS-enabled terminal which is registered with the IMS network. Alternatively, the first terminal may be a WebRTC enabled terminal, and the first terminal and the third terminal may communicate with each other via two WGws.

The third terminal may send an HTTP request, based on said link, to the WGw causing the WGw to generate a SIP INVITE containing the conference/chat-correlator and send the SIP INVITE to the first terminal or to a further WGw to which the first terminal is connected. The conference/chat-correlator may be included within a SIP header of the SIP INVITE.

The conference/chat-correlator may be encrypted and the method may further comprise decrypting the conference/chat-correlator at the WGw prior to sending the session invite to the first terminal.

The link may be URL which is executed in a WebRTC-enabled web browser on the third terminal.

The ad hoc conference or chat session may be mediated by a conferencing or messaging application server respectively of the IMS network.

According to a second aspect of the present invention there is also provided a method for use within a first terminal engaged in an ongoing session with a second terminal facilitated by an IP Multimedia Subsystem (IMS) network. The method comprises generating on the first terminal a link providing access to a conference/chat-correlator identifying the ongoing session, and making the link accessible to a third terminal that is not provisioned or not registered with the IMS network, and receiving a session invite originating from the third terminal, the session invite including the conference/chat-correlator. The method further comprises setting up a new session with the third terminal based on the session invite, setting up an ad-hoc conference or chat session using the IMS network, and transferring said ongoing session and said new session to the ad-hoc conference or chat session.

Embodiments of the invention may allow external users to join a conference or instant messaging (chat) session in the IMS without necessarily being part of the IMS community (either temporarily or permanently by virtue of not being registered or provisioned in the IMS). Embodiments may have very little or no impact on the IMS infrastructure. The solution may therefore be implemented at minimal cost—a key advantage for network operators.

The session invite may be received directly from a WebRTC gateway, WGw, in which case the session invite is received in the form of a SIP INVITE.

The step of generating a link may comprise generating a URL which incorporates the conference/chat-correlator in an encrypted form. The step of making the link accessible to a third terminal may comprises sending the link within an SMS message, instant message, or email.

DETAILED DESCRIPTION

Figure 1:
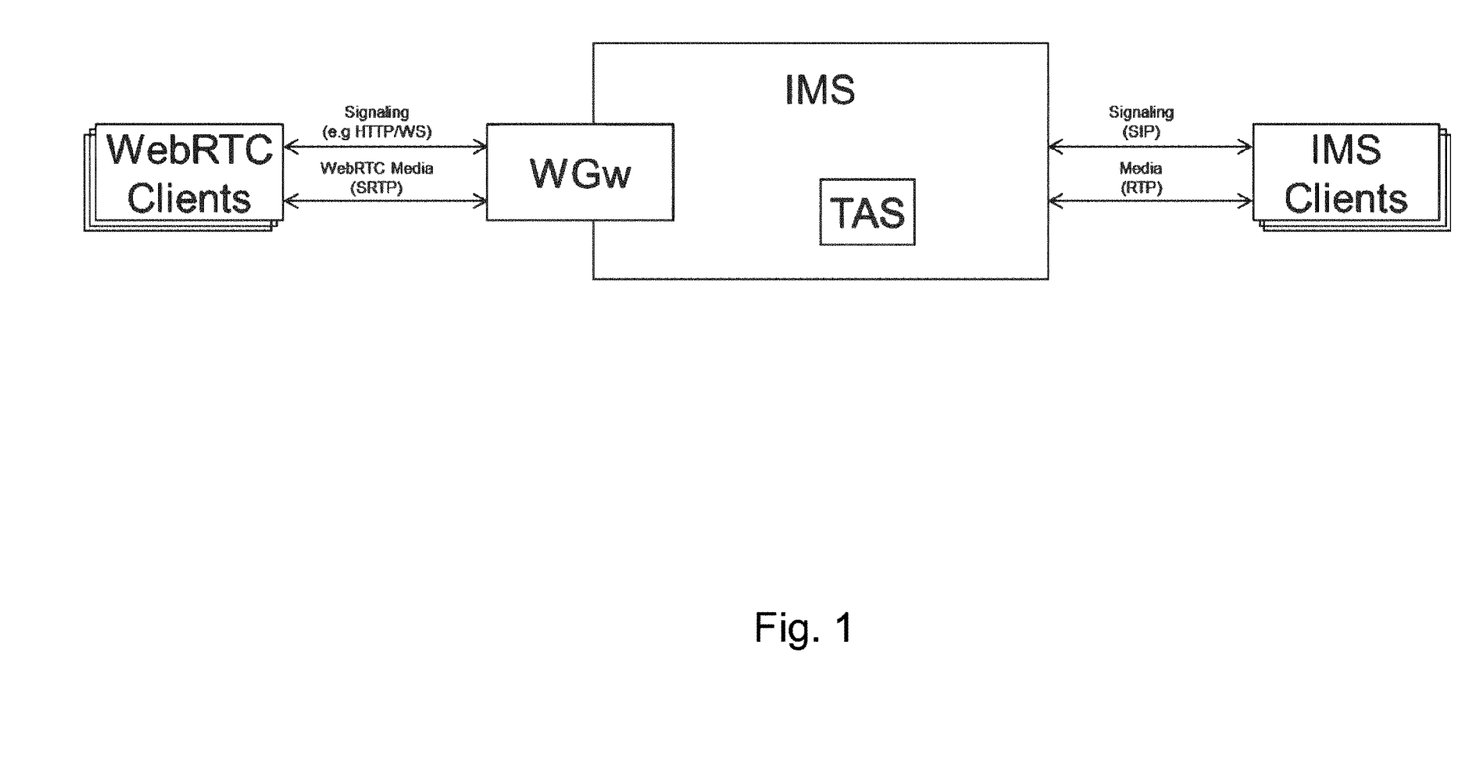
FIG. 1 illustrates schematically a network comprising an IMS core network and a number of clients—the clients including both IMS clients and WebRTC clients, the latter connected to the IMS via a WebRTC gateway.

FIG. 1 illustrates schematically a network comprising: an IMS core network having a Telephony Application Server (TAS); a set of IMS clients; a set of WebRTC clients; and a WebRTC gateway (WGw) which enables the WebRTC clients to connect to the IMS network. The WebRTC enabled devices communicate with the WGw via the Internet (e.g. using the HTTP and SRTP protocols for signalling and media respectively). The IMS clients communicate with the IMS core network directly using, e.g. the SIP and RTP protocols for signalling and media respectively.

A first embodiment of the invention will now be described with reference to FIG. 2. In this embodiment, a pair of users, A and B, are using SIP clients which are registered with the IMS (for simplicity it is assumed that both SIP clients are registered with the same IMS although this need not be the case). Users A and B have an ongoing two-party call/session within the IMS, S100, e.g. relying on SIP+RTP as part of a VoIP protocol.

Suppose User A now wants to invite an external User C to the session. User C is contactable by some means (email or SMS for example) and has access to the internet, e.g. via an ISP network. However, User C is not registered/provisioned in the IMS and could therefore be considered to be a "guest" user.

User A starts the process of inviting User C to the session by first creating a context related to the ongoing call between User A and User B. The context is represented by a so-called conference-correlator, which is defined herein as the entity which connects a call (which later originates from User C) with a created conference. The conference-correlator is embedded (possibly encrypted) in a SIP tag. The term "context" as used herein includes anything that makes it possible to relate back to the ongoing call at a later time. The tag can be constructed from a set of parameters, such as User A's identity, validity, and the conference-correlator—all optionally encrypted into a string. The validity is a time period for which the tag remains valid, and is added for security reasons. The validity is typically set to a short time period (e.g. a few minutes or less—enough time for the email/SMS sent from User A to reach and be discovered by User C) and protects the network from denial-of-service (DoS) attacks. The context is represented by the conference-correlator.

User A then generates a URL internally on the User A device, S102, and includes the tag in the URL. The exact structure of the URL is not important for the working of the embodiment, but for illustration purposes it may have the following structure: http://wgw.com/conference/12345679ABCDEFGHI. The base URL (e.g. http://wgw.com/conference) can be provisioned or hardcoded in the client (S103).

User A sends the URL to User C by some appropriate mechanism, e.g. via SMS, email etc., S104. The exact means by which the link is sent from User A to User C is not important for the working of the embodiment.

User C receives the URL and he or she clicks on the URL which triggers opening of the WebRTC-enabled browser. The URL is thereby executed, i.e. sent to User C's WebRTC gateway (WGw-C). Specifically, a WebRTC communication request is sent from User C to the WGw-C in an HTTP request. WGw-C receives the URL, decrypts the tag and establishes the call to User A by means of a SIP INVITE request which is sent to User A over the IMS network S108. The conference-correlator is included in the SIP INVITE request. The tag is decrypted at WGw-C since it stores, or has access to, the relevant crypto-graphical keys. The result is that User A and User C now have an active two-party session.

The SIP INVITE request can convey the conference-correlator in multiple ways. One example which employs a new header is:
INVITE sip:userA@domain.com SIP/2.0
To: sip:userA@domain.com
From: <sip:guest@domain.com>;tag=i6cjv7ie-13a4
Conference-Correlator=12345679ABCDEFGHI Call-ID: 10.10.10.10_123456789
CSeq: 1 INVITE
Max-Forwards: 66

Alternatively, the conference-correlator may be included in an existing SIP header (e.g. the From-header), or in the SDP body of the request.

Figure 2:
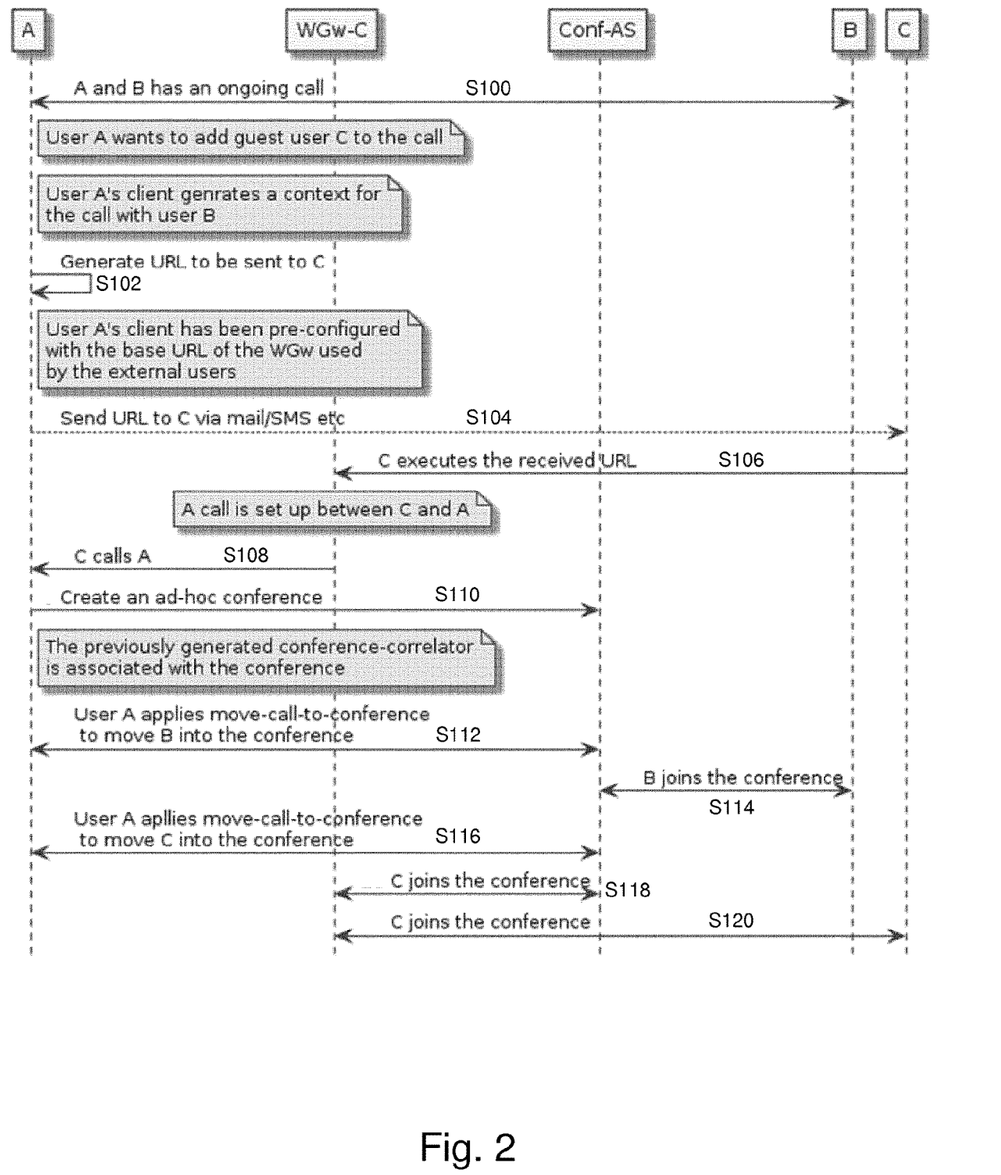
FIG. 2 illustrates schematically a method according to a first embodiment of the invention.

Returning to the signaling flow of FIG. 2, User A now detects that the received call from User C contains a conference-correlator and hence triggers the creation of an ad-hoc conference (according to the standards referenced above in the background section), S110, by means of a conference application server (Conf-AS) within the IMS. User A will detect the conference-correlator upon receipt at User A's terminal of the SIP INVITE request originating from WGw-C, and User A will proceed to establish the call between User A and User C and thereafter, or in parallel, create the conference.

User A's client moves the active session with User B to the conference, S112-S114. User A and B have now joined the conference.

User A's client now moves the active session with User C to the conference, S116-S120. User A, User B, and User C have now all joined the conference. Alternatively User A could first move the active session with User C to the conference and then move the active session with User B to the conference.

A second embodiment of the invention will now be described with reference to FIG. 3. In this embodiment, User A is a WebRTC user and is a provisioned user, registered in the IMS network, via the WGw-A. User B is using a SIP client which is registered within the IMS. Users A and B have an ongoing two-party call/session S200 via User A's WebRTC gateway (WGw-A)—which allows User A to establish a call with User B in the IMS.

Suppose User A now wants to invite the external User C (a guest user, also outside of the IMS, i.e. not provisioned/registered in the IMS) to the session. User A retrieves a URL from WGw-A, S202. WGw-A creates a context related to the ongoing call between User A and User B, the context including a tag and a session identifier, and includes the tag in the URL. The tag can be constructed by a set of parameters, such as User A's identity, validity, and a conference-correlator—all encrypted into a string. The validity parameter is added for security reasons and is typically set to a short time period (e.g. a few minutes or less) and protects the network from DoS attacks. The context is represented by the conference-correlator. Again, the exact structure of the URL is not important for the working of the embodiment, but for illustration purposes it may look like this: http://wgw.com/conference/12345679ABCDEFGHI.

User A sends the URL to User C by some appropriate mechanism, e.g. via SMS, email etc., S204. The exact means by which the URL is sent is not important for the working of the embodiment.

User C receives the URL from User A and executes the URL in a WebRTC enabled browser, S206. A WebRTC communication (HTTP) request is sent from User C to User C's WebRTC gateway (WGw-C). WGw-C receives the request from User C, decrypts the tag and establishes the call to User A by passing the communication request to User A via WGw-A, for example all or part of the decrypted tag is added to a SIP INVITE request and sent to User A. Specifically, the INVITE request is sent from WGw-C, routed via the IMS, to WGw-A, S208, because User A and User C are both using web based clients. Once WGw-A receives the SIP INVITE it forwards it as an event to User A, S210. There are different mechanisms as to how that can be done, e.g. either as an event delivered on the HTTP channel (known as long-polling), or using Web Sockets, which is a technique to deliver asynchronous events to a client. The result is that User A and User C now have an active two-party session via both User A's WGw-A and User C's WGw-C, S208-S210.

The SIP INVITE request can convey the conference-correlator in multiple ways. One example, which employs a new header is:

INVITE sip:userA@domain.com SIP/2.0
To: sip:userA@domain.com
From: <sip:guest@domain.com>;tag=i6cjv7ie-13a4
Conference-Correlator=12345679ABCDEFGHI
Call-ID: 10.10.10.10_123456789
CSeq: 1 INVITE
Max-Forwards: 66

Alternatively, the conference-correlator may be included in an existing SIP header (e.g. the From-header), or in the SDP body of the request.

Figure 3:
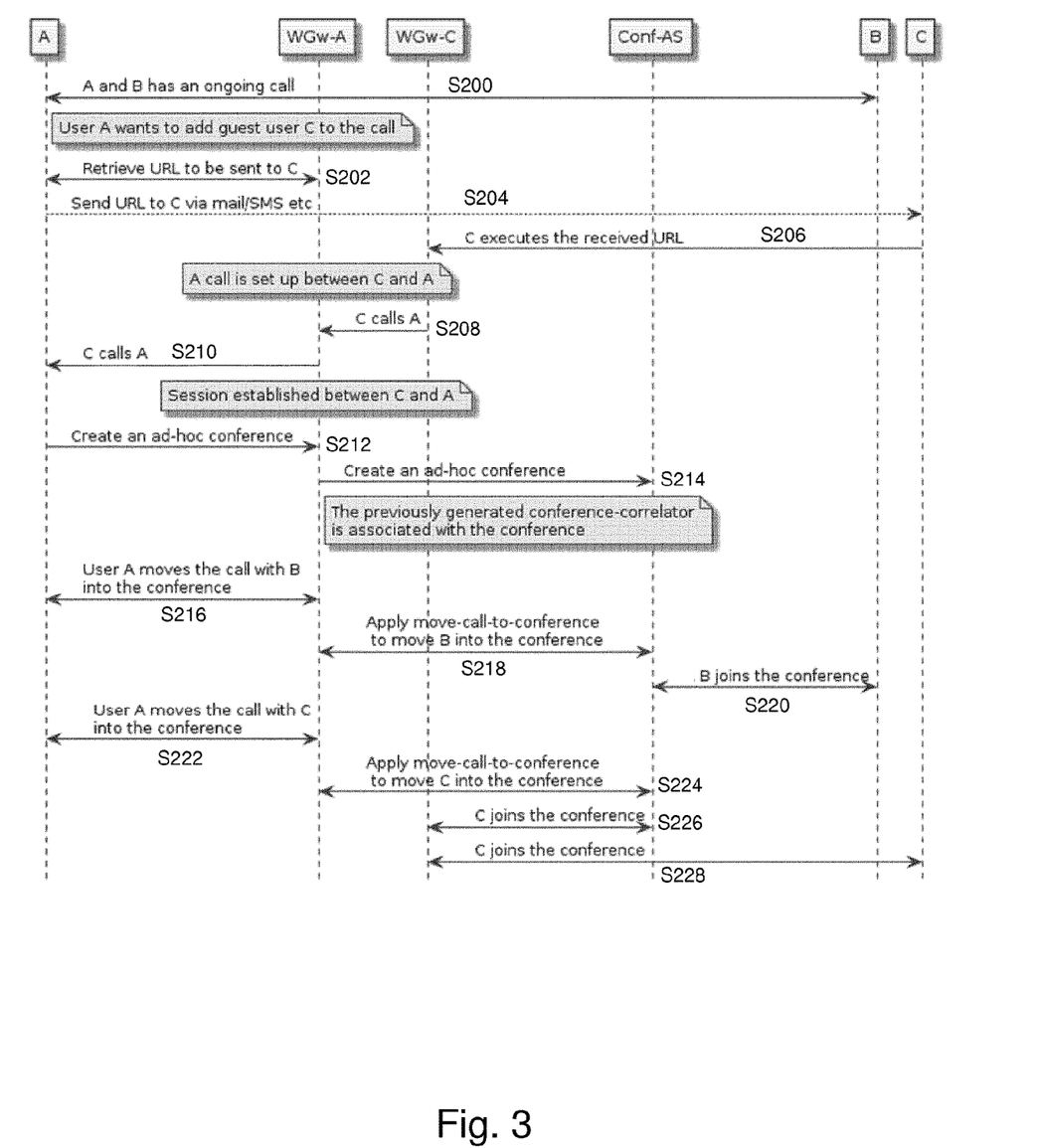
FIG. 3 illustrates schematically a method according to a second embodiment of the invention.

Returning to the signaling flow of FIG. 3, User A now detects that the received call from User C contains a conference-correlator and hence triggers creation of an ad-hoc conference, S212-S214, by means of a conference application server (Conf-AS) within the IMS. User A sends the request to WGw-A to create the conference, and WGw-A in turn sends the SIP INVITE to the IMS network to create the conference. User A's client then moves the active session with User B to the conference. Users A and B have now joined the conference, S216-S220. User A's client now moves the active session with user C to the conference, S222-S228. User A, User B, and User C have now all joined the conference.

Figure 4:
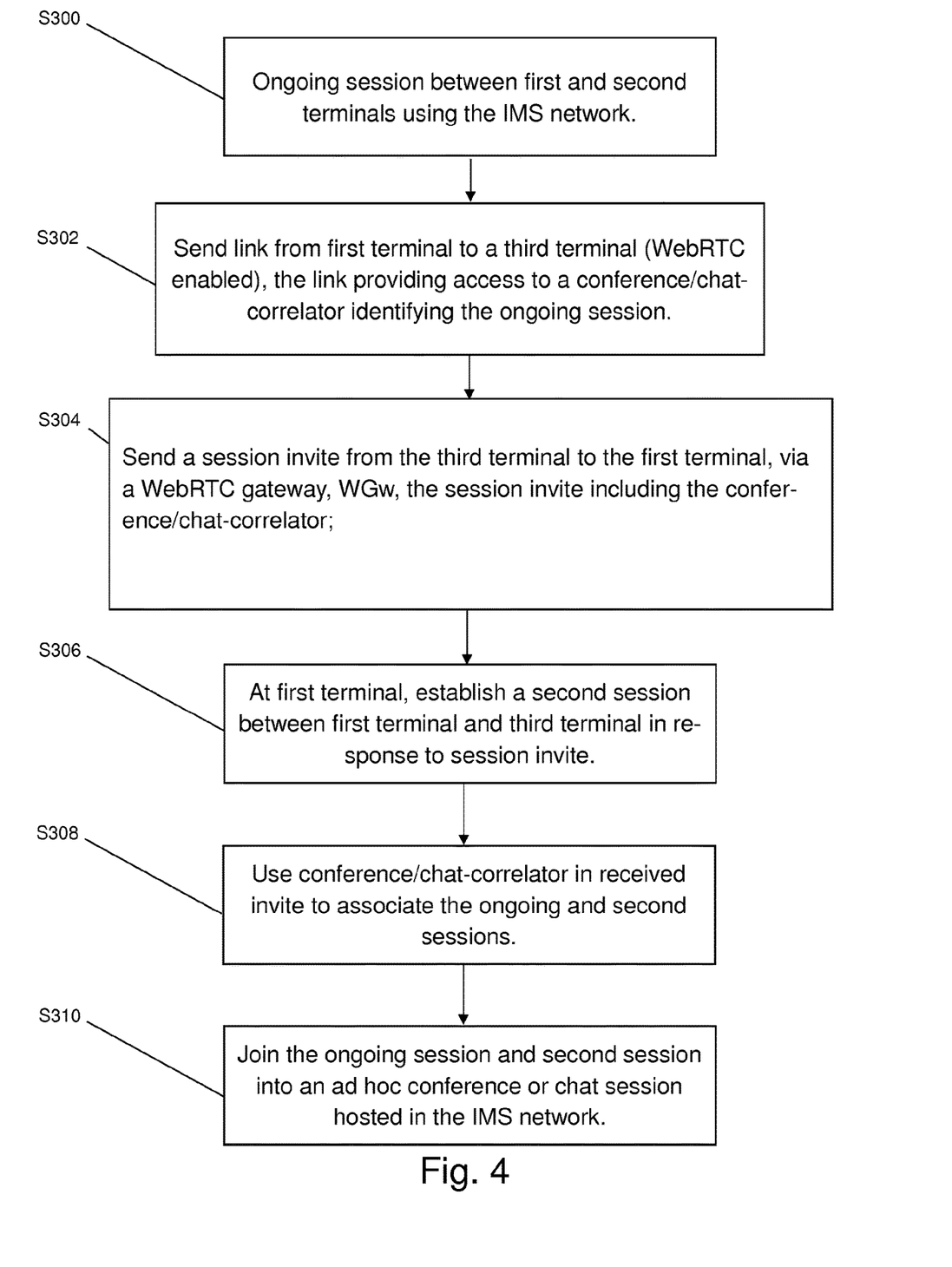
FIG. 4 is a flow diagram of a method for use with a system according to an embodiment of the invention.

FIG. 4 illustrates in a flowchart a method which is applicable to both of the embodiments described above. The method starts at S300 with an ongoing session between first and second terminals using the IMS network. At S302 a link is sent from the first terminal to a third terminal (which is WebRTC enabled), the link providing access to a conference-correlator identifying the ongoing session between the first and second terminals. At S304 the third terminal executes the link which causes an instruction to be sent from the third terminal to a WebRTC gateway to generate a session invite and send the session invite to the first terminal, the session invite including the conference-correlator. At S306 the first terminal establishes a new (second) session with the third terminal in response to receiving the session invite from the WebRTC gateway. At S308 the first terminal uses the conference-correlator in the received session invite to associate the ongoing session with the second session. At S310 the ongoing and second sessions are joined into an ad hoc conference hosted in the IMS network. Thus the first, second, and third terminals are now engaged in a conference hosted in the IMS network.

Figure 5:
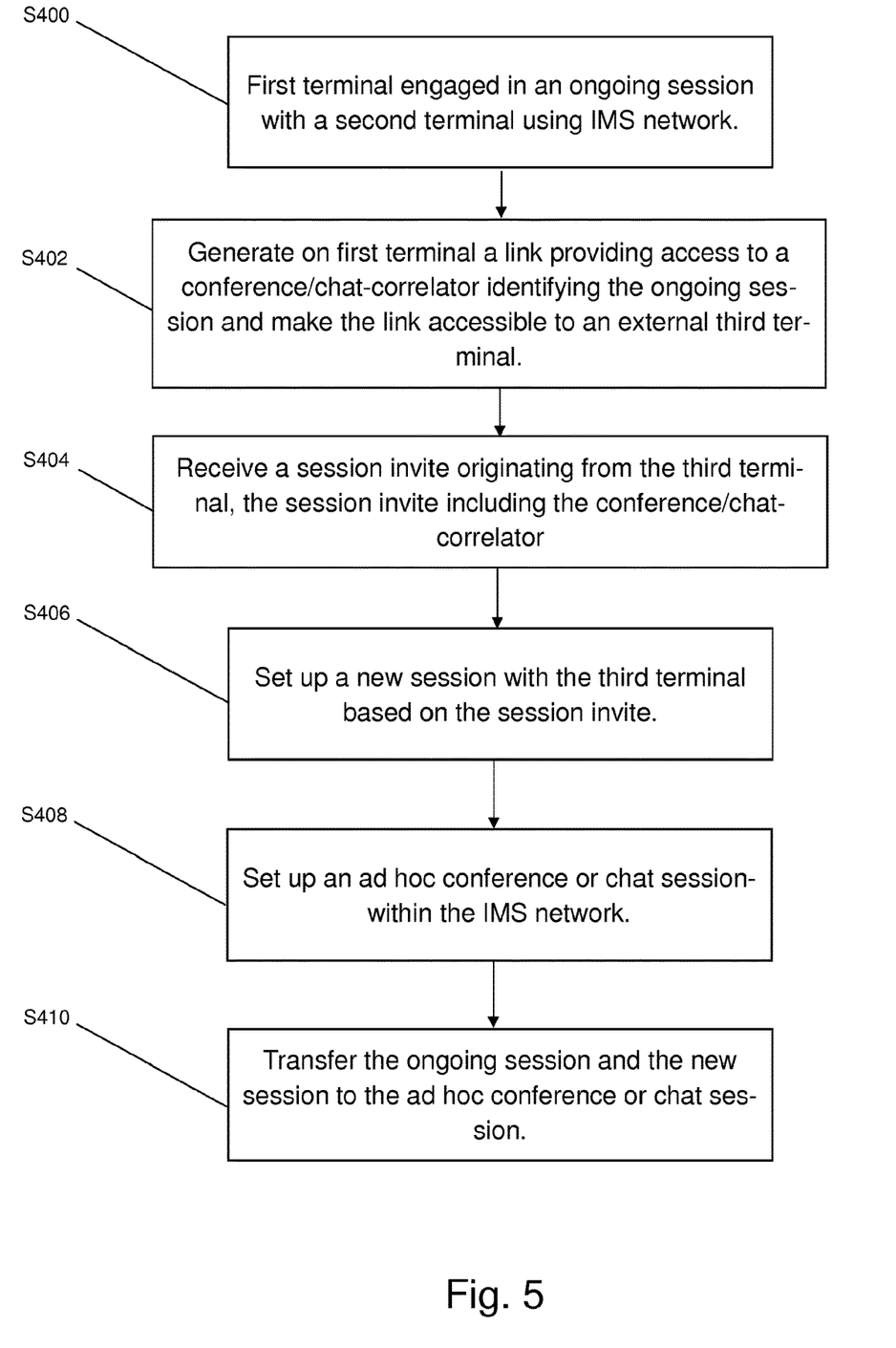
FIG. 5 is a flow diagram of a method for use with an IMS client according to an embodiment of the invention.

FIG. 5 illustrates a method for use with a terminal which is application to both of the embodiments described above. The method starts at S400 where the first terminal is engaged in an ongoing session with a second terminal using the IMS network. At S402 the first terminal generates a link providing access to a conference-correlator identifying the ongoing session with the second terminal and makes the link accessible to an external third terminal. At S404 the first terminal receives a session invite originating indirectly from the third terminal, where the session invite includes the conference-correlator. At S406 the first terminal sets up a new session with the third terminal based on the session invite. At S408 the first terminal sets up an ad hoc conference within the IMS network. At S410 the first terminal transfers the ongoing session and the new session to the ad hoc conference. Thus all users are now engaged in a conference hosted in the IMS network.

In the case where the URL is sent to multiple external users, it is often useful to be able to include a nickname so that other people are able to see who has joined the conference. In step S106 or S206, when the external user executes the URL in his browser, a nickname can be added to HTTP request that is sent to the WGw. For example, if User C's name is "John":
http://wgw.com/conference/12345679ABCDEFGHI?nickname=John The SIP INVITE request may then look like:
INVITE sip:userA@domain.com SIP/2.0
To: sip:userA@domain.com
From: John <sip:guest@domain.com>;tag=i6cjv7ie-13a4
Session-Correlator=12345679ABCDEFGHI
Call-ID: 10.10.10.10_123456789
CSeq: 1 INVITE
Max-Forwards: 66

The invention, according to both embodiments, utilizes WebRTC which enables real time media in browsers. Any user of a web browser, such as Google Chrome™ or Firefox™, that has received such a URL as described above will be able to join a conference facilitated by an IMS network.

The approach described above may be applied to a group chat/group instant messaging session. In such a scenario, two users are engaged in a one-to-one chat/messaging session, and want to invite a third user to that chat/messaging session. A link, including a chat-correlator, is generated and sent to the third user, who in turn clicks on the link and then joins the group chat. In such a scenario, the Telephony Application Server (TAS) described with reference to the two embodiments above would be replaced by a messaging application server of the IMS.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of facilitating participation of a WebRTC enabled terminal in an ad hoc conference or chat session hosted in an IP Multimedia Subsystem (IMS) network, where there is an ongoing session between first and second terminals using the IMS network, the method comprising:
    sending a link from the first terminal to a third terminal that is not provisioned or not registered with the IMS network, where the third terminal is said WebRTC enabled terminal and the link provides access to a conference/chat-correlator identifying said ongoing session;
    sending a session invite from the third terminal to the first terminal, via a WebRTC gateway, WGw, the session invite including the conference/chat-correlator;
    at the first terminal setting up a second session between the first terminal and the third terminal in response to the received session invite; and
    at the first terminal using the conference/chat-correlator in the received session invite to associate the ongoing and second sessions, and joining both sessions into an ad hoc conference or chat session hosted in the IMS network.

2. A method according to claim 1, wherein the first terminal is an IMS-enabled terminal and is currently registered with the IMS network.

3. A method according to claim 1, wherein the first terminal is a WebRTC enabled terminal.

4. A method according to claim 3, wherein the first terminal and the third terminal communicate with each other via two WGws.

5. A method according to claim 1, wherein said step of sending a session invite comprises the third terminal sending an HTTP request, including the conference/chat-correlator, to the WGw, and the WGw generating a SIP INVITE containing the conference/chat-correlator and sending the SIP INVITE to the first terminal or to a further WGw to which the first terminal is connected.

6. A method according to claim 5, wherein the conference/chat-correlator is included within a SIP header of the SIP INVITE.

7. A method according to claim 1, wherein the conference/chat-correlator is encrypted and the method further comprises decrypting the conference/chat-correlator at the WGw prior to sending the session invite to the first terminal.

8. A method according to claim 1, wherein the link is a URL which is executed in a WebRTC-enabled web browser on the third terminal.

9. A method according to claim 1, wherein the ad hoc conference or chat session is mediated by a conferencing or messaging application server respectively of the IMS network.

10. A method for use within a first terminal engaged in an ongoing session with a second terminal facilitated by an IP Multimedia Subsystem (IMS) network, the method comprising:
    generating on the first terminal a link providing access to a conference/chat-correlator identifying the ongoing session, and making the link accessible to a third terminal that is not provisioned or not registered with the IMS network;
    receiving a session invite originating from the third terminal, the session invite including the conference/chat-correlator;
    setting up a new session with the third terminal based on the session invite;
    setting up an ad-hoc conference or chat session using the IMS network; and
    transferring said ongoing session and said new session to the ad-hoc conference or chat session.

11. A method according to claim 10, wherein the session invite is received directly from a WebRTC gateway, WGw.

12. A method according to claim 11, wherein the session invite is received in the form of a SIP INVITE.

13. A method according to claim 10, wherein the step of generating a link comprises generating a URL which incorporates the conference/chat-correlator in an encrypted form.

14. A method according to claim 10, wherein said step of making the link accessible to a third terminal comprises sending the link within an SMS message, instant message, or email.

\* \* \* \* \*